United States Patent
Rogero et al.

(10) Patent No.: US 8,894,034 B2
(45) Date of Patent: Nov. 25, 2014

(54) SPIGOT-TYPE FASTENER PROVIDED WITH AT LEAST ONE MEANS FOR MEASURING THE FORCE GENERATED BY AN AIRCRAFT ENGINE

(75) Inventors: Jean-Michel Rogero, Toulouse (FR); Christian Fabre, Tourmefeuille (FR); Herve Magnin, Flourens (FR)

(73) Assignee: Airbis Operations S.A.S., Toulouse (FR)

( * ) Notice: Subject to any disclaimer, the term of this patent is extended or adjusted under 35 U.S.C. 154(b) by 623 days.

(21) Appl. No.: 13/249,916

(22) Filed: Sep. 30, 2011

(65) Prior Publication Data

US 2012/0080582 A1   Apr. 5, 2012

(30) Foreign Application Priority Data

Oct. 5, 2010  (FR) ..................................... 10 58071

(51) Int. Cl.
   F16M 1/00   (2006.01)
   F16M 3/00   (2006.01)
   F16M 7/00   (2006.01)
   F16M 9/00   (2006.01)
   F16M 11/00  (2006.01)

(52) U.S. Cl.
   USPC .......................................... 248/666; 248/638

(58) Field of Classification Search
   USPC ..................... 248/666, 638, 554, 555; 244/54
   See application file for complete search history.

(56) References Cited

U.S. PATENT DOCUMENTS

| 5,369,990 | A  | * | 12/1994 | Zurek et al. ................. 73/114.32 |
| 6,297,741 | B1 | * | 10/2001 | Higgins ........................ 340/631 |
| 2011/0011972 | A1 |  | 1/2011 | Vache |
| 2011/0121132 | A1 | * | 5/2011 | Crook et al. .................... 244/54 |

FOREIGN PATENT DOCUMENTS

| GB | 2 074 289 A | 10/1981 |
| WO | WO 2009/118469 A2 | 10/2009 |

OTHER PUBLICATIONS

French Preliminary Search Report and Written Opinion issued on Jun. 27, 2011 in corresponding French Application No. 10 58071 filed on Oct. 5, 2010 (with an English Translation of Categories).

* cited by examiner

*Primary Examiner* — Amy J. Sterling
(74) *Attorney, Agent, or Firm* — Oblon, Spivak, McClelland, Maier & Neustadt, L.L.P.

(57) ABSTRACT

A spigot-type fastener for an aircraft is to be interposed between the structure of the aircraft and an attachment structure of the aircraft engine. The fastener is to absorb the force generated by the engine along two orthogonal axes. The fastener includes a first part, a second part, a third part, and one or more strain gauges. One end of the first part is secured to the second part. One end of the second part is separated from the first part by a clearance. The opposite end of the second part fits into a recess of the third part via a protrusion, such that the force along both axes is transmitted by the first part to the third part by the second part.

5 Claims, 1 Drawing Sheet

SPIGOT-TYPE FASTENER PROVIDED WITH AT LEAST ONE MEANS FOR MEASURING THE FORCE GENERATED BY AN AIRCRAFT ENGINE

This invention relates to a spigot-type fastener provided with at least one means for measuring the force generated by an aircraft engine Such a fastener is particularly intended for the aerospace industry during the test flight to measure this force as accurately as possible.

On existing aircraft, the engines are suspended below the wings by an attachment structure or attached laterally to the strut mounted on the fuselage. This attachment structure is also called an attachment strut or pylon. In a manner known per se, this pylon has a rigid structure forming a box, comprised by the assembly of the spars interconnected by multiple transverse ribs.

In both attachment configurations, the structural bond between the primary structure of the strut and the wing is generally carried out by three fasteners, one fastener consisting of two lateral half-fasteners, a rear fastener, and an intermediary fastener designed to absorb the thrust forces generated by the associated engine. To do this, the intermediary fastener designed to absorb the thrust forces, also called the "spigot" fastener, generally takes the form of a ball attached to the rear upper spar of the rigid structure, between the front fastener and the rear fastener. This very large spigot fastener also includes a shaft, or shear pin, fixed under the wing of the aircraft by means of a fitting bracket, so as to be able to fit into the ball.

The structural bond between the engine and the attachment strut is generally carried out by two fasteners, one fastener having a pyramid at the end, a rear fastener, and a mechanism to absorb the thrust force with lateral thrust-reacting connecting rods. The pyramid allows the engine to move forward relative to the wing.

This attachment structure of the engine therefore has as its main function to hang the engine from an element of the wing or fuselage while allowing thrust force to be effectively absorbed by a set of thrust-reacting elements such as connecting rods and the spigot fastener. To measure the force generated by the engine, it is known to equip this attachment structure to measure the force of the engine. More specifically, the connecting rods of the attachment mechanism between the engine and the strut are equipped with strain gauges to measure force generated by the engine while operating and transmit to the measurement system by means of thrust-reacting elements.

As part of measuring the force, it would be particularly advantageous to also equip the spigot fastener to measure thrust. By equip the spigot, this means to mount one or more means of measuring thrust, such as strain gauges, onto the spigot.

Figure 1:
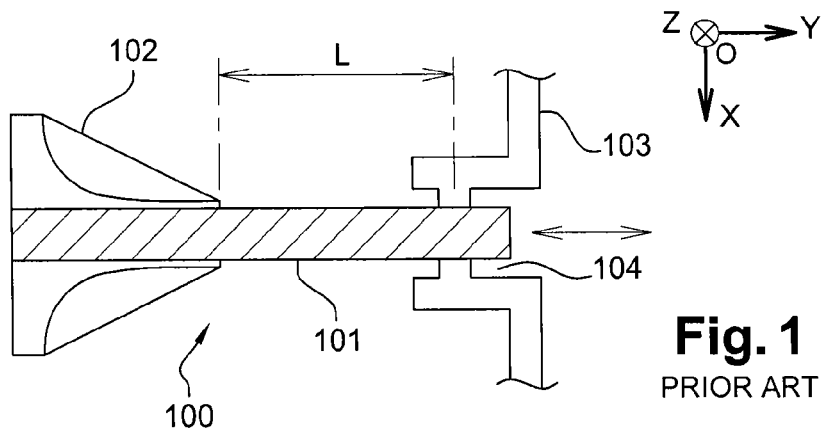

However, depending on the conventional form of the spigot, it may be not possible to equip it. FIG. 1 schematically shows the structural form of such a spigot 100. It is comprised mainly of a shaft 101 whose one end is rigidly fixed to a structural element 102 such as a spar of the strut, the opposite end tightly penetrating a recess 104 formed by a structural element 103, such as in the wing. The spigot is placed at coordinates (OXYZ). Here, and throughout the specification, "O" refers to an origin of an orthogonal XYZ coordinate system. Under the effect of the thrust force, the shaft 101 moves freely along the axis (OY), and the length L that defines the length of strain varies, which makes it difficult to measure the thrust force.

This invention provides a new structural form for the spigot fastener that can be interposed between the wing and an attachment structure or attachment strut designed to absorb the thrust force generated by the associated engine, while allowing more accurate measurements to be taken by equipping at least one of the elements of the spigot fastener.

To do this, the spigot fastener according to this invention comprises an intermediary part interposed between the shaft and the recess so as to keep the length of strain L constant while maintaining the mobility of the shaft in the recess. In this manner, the spigot works mainly on the length L, which does not vary or varies only slightly, thereby making the measurements more accurate.

The purpose of the invention is therefore to provide a spigot-type fastener for an aircraft, designed to be interposed between the structure of the aircraft and an attachment structure of the aircraft engine, this fastener being designed to absorb the thrust force generated by the aircraft engine along two orthogonal axes (OX) and (OZ).

According to the invention, it comprises a first part, one end of said first part being secured to a second part, one end of the second part being separated from the first part by a distance j and the opposite end of the second part being fit into a recess of a third part via a protrusion, such that the force along both axes is transmitted by the first part to the third part by means of the second part and the means for measuring the force are mounted on at least one of the parts.

According to one embodiment of the invention, the second part is comprised of a shaft of diameter r and a flange of thickness e, said shaft being positioned in parallel to the axis (OY).

Given the essential function it serves, namely to allow a transmission of the force of the first part to the third part while keeping the length of strain L constant and while ensuring the security of such a fastener as in the invention, the rigidity of the shaft must be greater than the rigidity of the flange.

According to one embodiment of the invention, this second part is a single piece.

According to another embodiment of the invention, the flange is a part connected to the shaft.

To measure the thrust force transmitted along the axes (OX) and (OZ), the fastener should be equipped with a means of measuring the force along the axis (OX) by measuring the movement of the end of the second part relative to the first part.

Preferably, the clearance j between the end of one extension of the first part and the shaft of the second part that is positioned in parallel to the axis of symmetry of the spigot-type fastener is determined in a manner such that, when a load threshold is exceeded along the axes OX or OZ, the end of the shaft of the second part comes into contact with an extension of the first part.

Advantageously, the clearance j is not constant along the various directions in order to impose different force limits.

The invention also relates to an assembly for aircraft comprising an engine, an attachment structure, said assembly comprising a multitude of engine mounts interposed between the aircraft wing and the engine's attachment structure.

Figure 2:
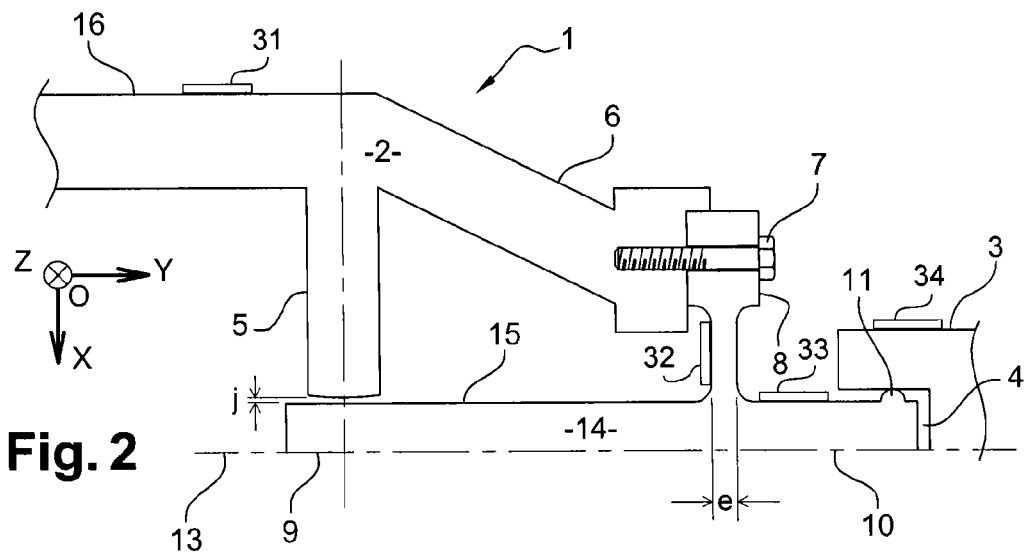
Figure 3:
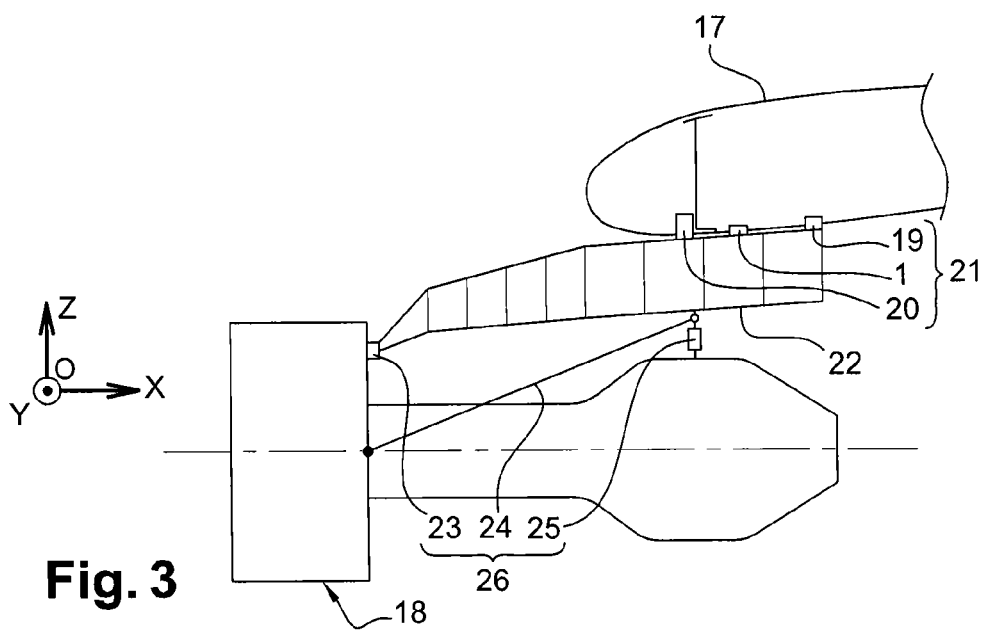

In its various possible embodiments, the invention will be described in more detail with reference to the accompanying drawings, in which:

FIG. 1 schematically shows a spigot-type fastener according to the prior art;

FIG. 2 schematically shows a sectional view of a spigot-type engine mount according to the invention;

FIG. 3 schematically shows a sectional view of an assembly defined according to the intervention and interposed between the attachment strut and the wing.

Generally, it is particularly advantageous to be able to measure the actual force generated by the engine under actual conditions of an airplane's flight. This accurate measurement of the actual value of the thrust of an engine is particularly important for the aerospace industry in order to minimize the cost of the airplane's fuel consumption.

The spigot-type fastener as shown in FIG. 2 makes it possible to connect an engine's attachment strut to the bottom of the aircraft's wing. According to an essential characteristic of the invention, this fastener is a simple and compact mechanism, sized and optimized to transmit to the attachment strut only the force exerted by the engine in two orthogonal directions.

To analyze the force transmitted by the fastener, a coordinate OXYZ is assigned to the engine, where the OX axis, directed forward, is oriented along the longitudinal axis of the engine, the axis OY is oriented laterally on a horizontal plane, and the axis OZ is oriented vertically upward. FIG. 2 shows the fastener assigned in such a manner. Relative to this, the fastener transmits thrust force along a first direction, mainly parallel to the longitudinal axis of the engine OX, and along a second direction, mainly parallel to a transverse axis of the engine, perpendicular to the axis OX.

More specifically, the fastener of this invention is also designed to be equipped by means of measurement which are arranged in an appropriate manner on the parts comprising the fastener in order to measure the transmitted force.

FIG. 2 schematically shows a sectional view of such a spigot fastener or fitting 1 in the plane (OXY). Because its shape is symmetrical relative to an axis of symmetry 13, FIG. 1 only shows a portion of the fastener relative to this axis of symmetry.

The spigot fastener includes a first part 2. This first part 2 includes a shaft 16 oriented in parallel to the axis of symmetry 13. One end of this shaft 16 is designed to attach, for example, onto a structural element of the attachment strut by means of known mechanical attachment. The opposite end of this shaft 16 has two extensions 5, 6. The first of these indicated extensions 5 is arranged perpendicular to the shaft 16, the other extension 6 being secured to a second part 14. The first and second parts 2 and 14 are assembled together, for example by means of a bolt 7 or nuts.

This second part 14 is comprised of a shaft 15 of diameter r, oriented in parallel to the axis of symmetry 13 and a flange 8 of thickness e.

One end 9 of this shaft 15 is separated from the lower edge of the first extension 5 of the first part 2 by a distance j, and the opposite end 10 of this shaft 15 fits into a recess 4 of a third part 3. The end 10 is provided with a protrusion 11, such as a boss or ball, which comes to rest against the inner wall of the recess 4. This boss is fixed relative to the shaft 15 and relative to the recess 4.

Therefore, the first part 2 is rigidly fixed to an intermediary part that is free to move along the axis OY in the recess 4 of the third piece part 3. The absorption of force along the axes OX and OZ is thus transmitted by the first part 2 to the third part 3 by means of the second part 14.

Preferably, the rigidity of the shaft 15 should be much greater than the rigidity of the flange 8. Preferably, the second part 14 is a single piece, but it can also be a shaft with a connected flange. In this case, the bond between the axis and the flange should be free of potential matting.

The force on the interface between the second part 14 and the third part 3 cause a deformation of the flange 8 in the direction of the thickness e. This deformation causes a variation in the clearance j between the end of the first extension 5 and the shaft 15. The clearance j is selected in a manner so as to avoid contact with the range of measurement of force and to come into contact beyond the measurement range, before plastification of the flange 8.

The thickness e is advantageously low to allow greater deformation in the sense of the axis Ox of the flange 8. The purpose is thus to measure the deformation of the flange 8 along the axis Ox in order to determine the force along the axis Ox.

There are several ways to measure the deformation, the most common being the strain gauge.

The invention also relates to an assembly 21 for aircraft that comprises an engine 18, an attachment structure 22. This assembly comprises a multitude of engine mounts 1, 19, 20 interposed between the aircraft wing 17 and the engine's attachment structure 22. The engine 18 is also connected to the attachment structure by means of a second set 26 of fasteners 23, 24, 25.

According to a particular embodiment of the invention as shown in FIG. 3, the first set 21 comprises a rear fastener, a front fastener, and an intermediary fastener interposed between the engine and the attachment strut.

The terms "front" and "rear" are considered relative to a forward direction of the aircraft subsequent to the thrust exerted by the engines, this direction being parallel to the axis OX.

The intermediary fastener is a spigot-type fastener such as described above for absorbing force along the axes OX and OY. In the context of this application, the first part 2 is fixed, for example on the upper spar of the attachment strut 22, and the second part 3 is fixed below the wing 17 of the aircraft by means of a bracket. In this manner, the thrust force generated by the engine 18 is transmitted via the attachment strut 22 toward the wing. In particular, this force is absorbed by the spigot fastener 1, which makes it possible to accurately measure it using strain gauges 31-34 mounted on the shaft 15 and on the flange 8.

The invention claimed is:

1. A spigot-type fastener for an aircraft, to be interposed between a structure of the aircraft and an attachment structure of an aircraft engine, the fastener to absorb a force generated by the engine along two orthogonal axes, the fastener comprising:

a first part;
   a second part including a shaft and a flange, the shaft being positioned in parallel to a third axis orthogonal to the two orthogonal axes, the shaft having a diameter greater than a thickness of the flange;
   a first extension that extends from the first part, an end of the first extension being separated from one end of the second part by a distance such that the second part comes into contact with the first extension of the first part when a load threshold is exceeded along at least one of the two orthogonal axes;
   a third part; and
   one or more strain gauges to measure the force, the one or more strain gauges mounted on at least one of the first part, the second part, and the third part, wherein
   one end of the first part is secured to the second part,
   an opposite end of the second part, which is opposite to the one end of the second part, fits into a recess of the third part via a protrusion, such that the first part transmits the force along the two orthogonal axes to the third part by the second part and the second part is free to move in the recess along the third axis, and the one or more strain gauges measures a relative movement between the one end of the second part and the first part.

2. The fastener according to claim 1, wherein the second part is a single piece.

3. The fastener according to claim 1, wherein the flange is a part connected to the shaft.

4. The fastener according to claim 1, wherein the distance is not constant along the two orthogonal axes, the distance forming a first clearance of a first size along one of the two orthogonal axes and forming a second clearance of a second size different from the first size along the other of the two orthogonal axes in order to impose different force limits.

5. The fastener according to claim 1, wherein the protrusion on the opposite end of the second part is fixed along the two orthogonal axes relative to the second part and the recess.

* * * * *

UNITED STATES PATENT AND TRADEMARK OFFICE
CERTIFICATE OF CORRECTION

| | | |
|---|---|---|
| PATENT NO. | : 8,894,034 B2 | Page 1 of 1 |
| APPLICATION NO. | : 13/249916 | |
| DATED | : November 25, 2014 | |
| INVENTOR(S) | : Rogero et al. | |

It is certified that error appears in the above-identified patent and that said Letters Patent is hereby corrected as shown below:

On the title page, Item [73] should read:

-- Airbus Operations S.A.S., Toulouse (FR) --

Signed and Sealed this
Third Day of March, 2015

Michelle K. Lee
*Deputy Director of the United States Patent and Trademark Office*